Figure 3:
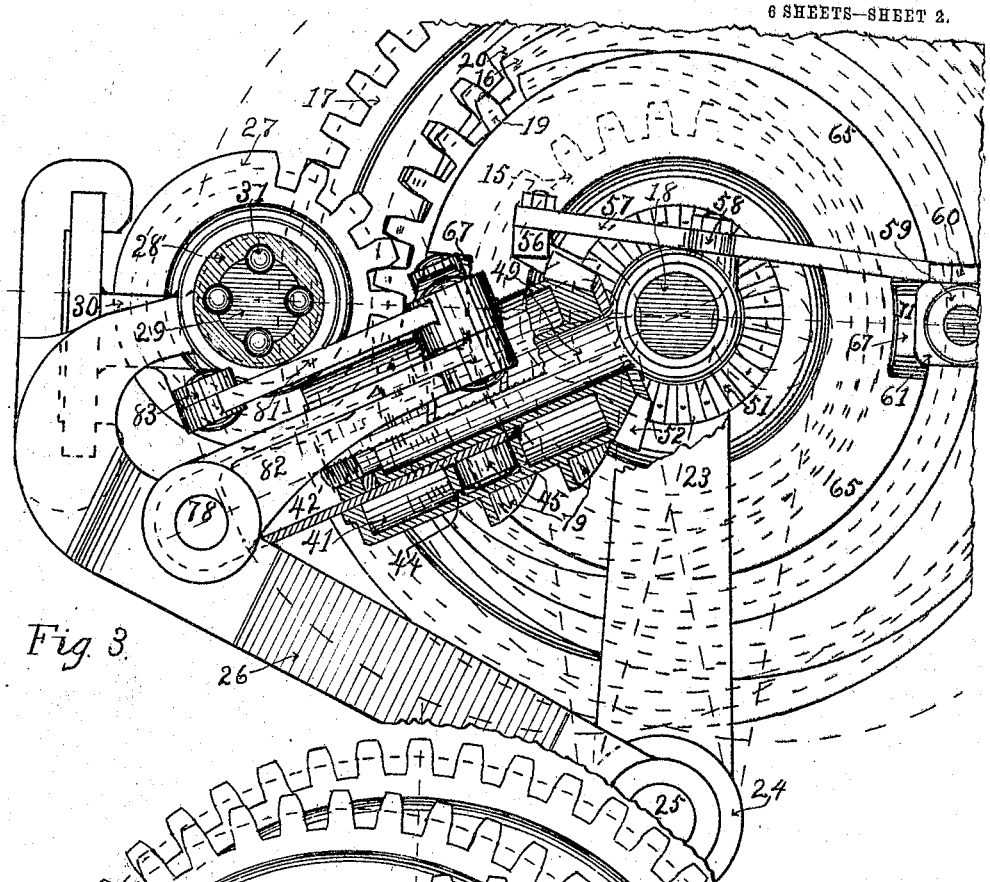

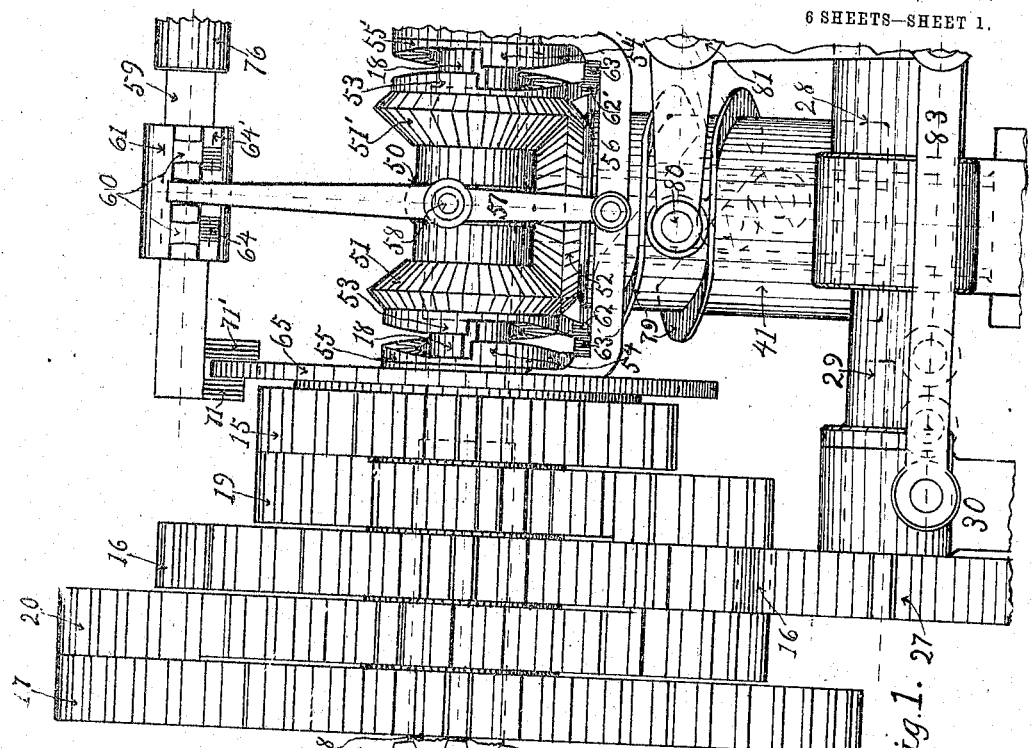

E. P. COWLES.
VARIABLE SPEED TRANSMISSION GEAR.
APPLICATION FILED SEPT. 5, 1903.

939,589.

Patented Nov. 9, 1909.
6 SHEETS—SHEET 2.

E. P. COWLES.
VARIABLE SPEED TRANSMISSION GEAR.
APPLICATION FILED SEPT. 5, 1903.
939,589.
Patented Nov. 9, 1909.
6 SHEETS—SHEET 3.
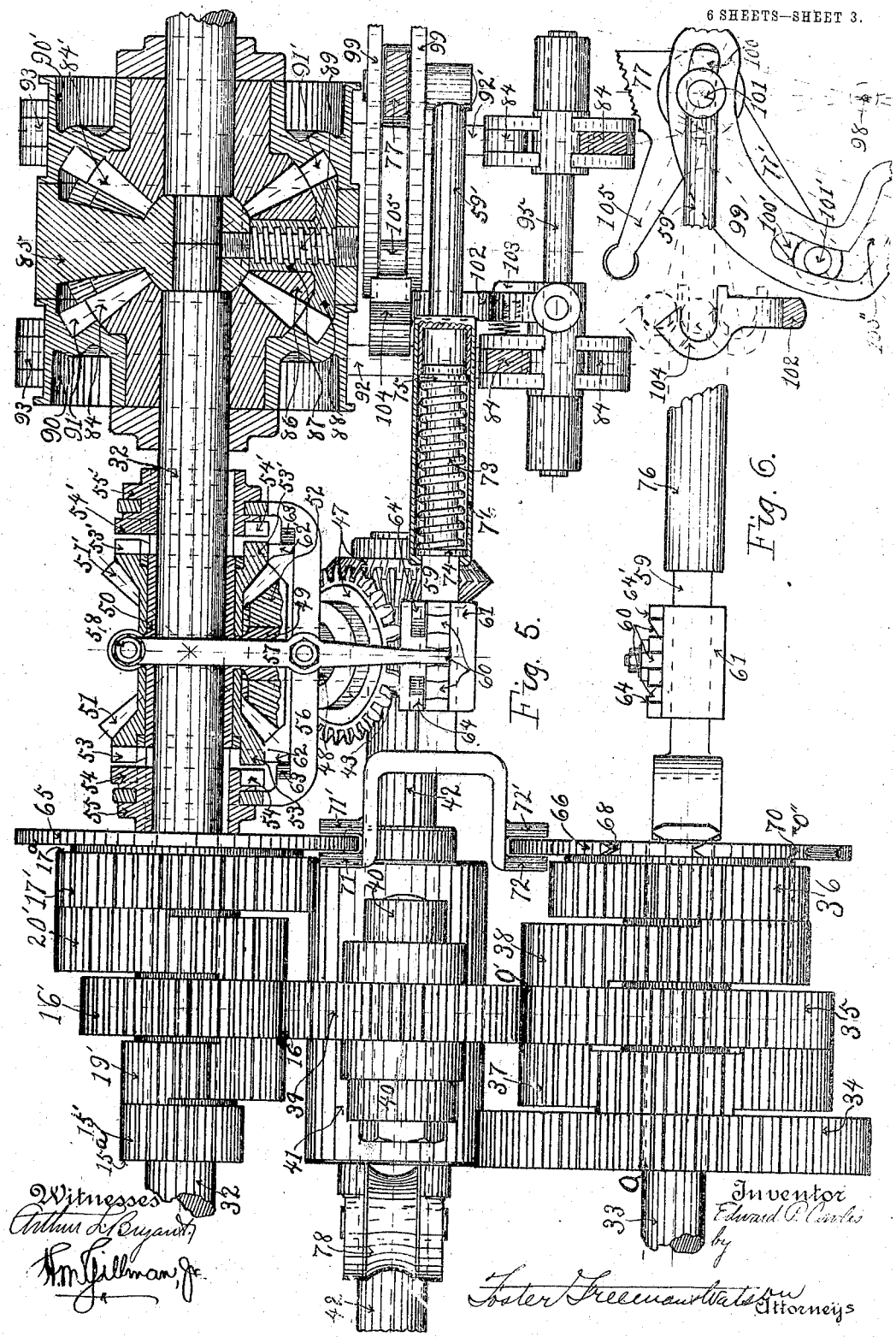

E. P. COWLES.
VARIABLE SPEED TRANSMISSION GEAR.
APPLICATION FILED SEPT. 5, 1903.
939,589.
Patented Nov. 9, 1909.
6 SHEETS—SHEET 4.
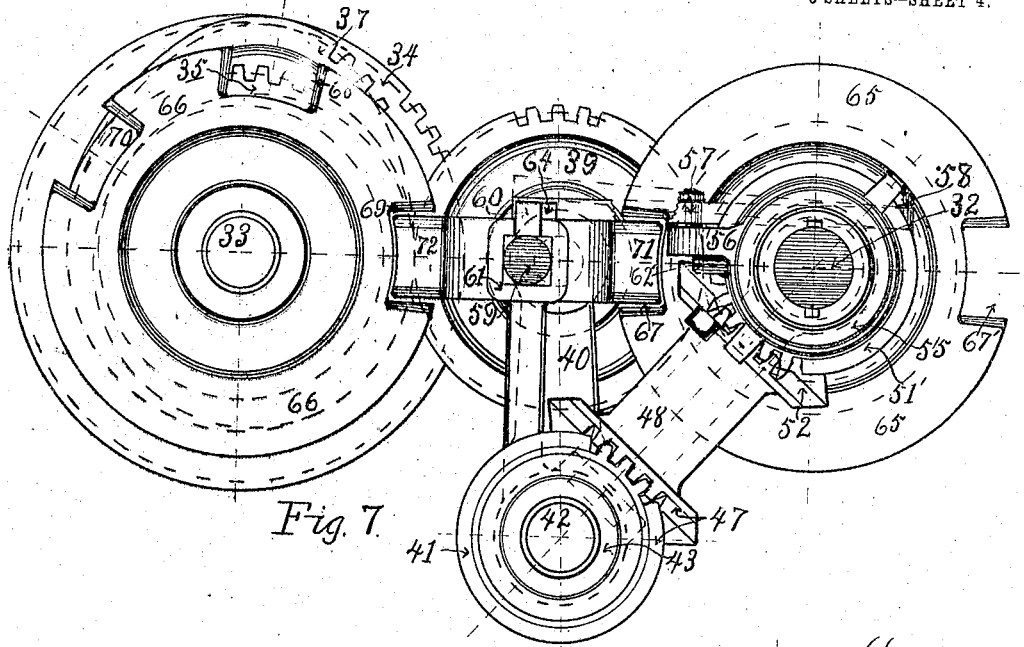
Fig. 7.
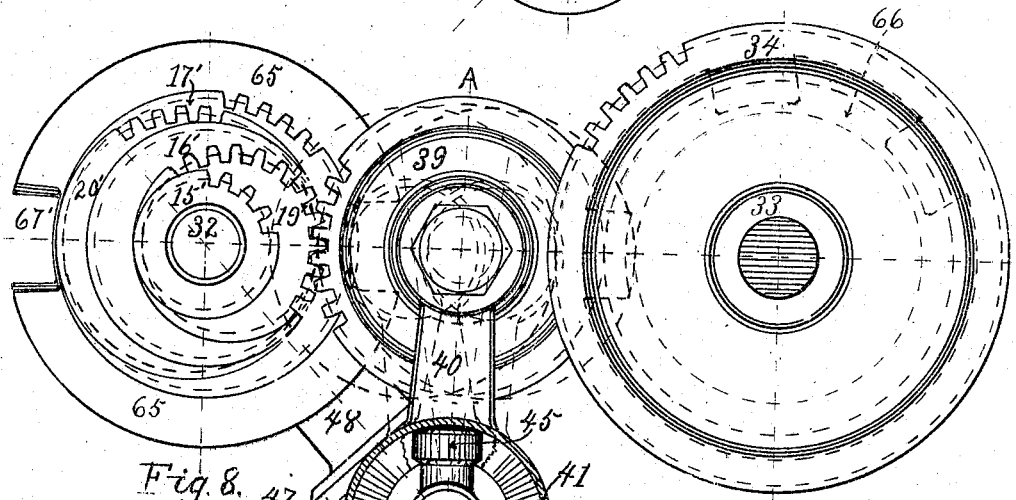
Fig. 8.
Fig. 9.
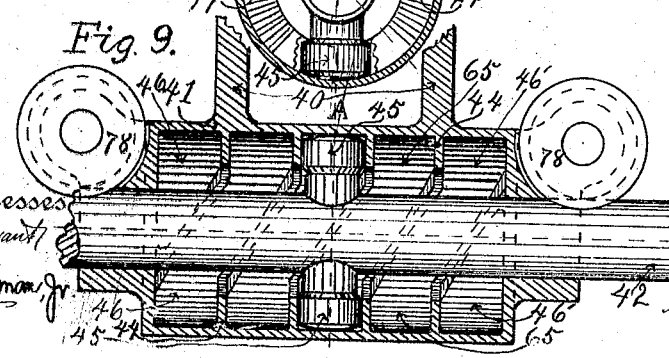
Witnesses
Inventor
Edward P. Cowles
by Foster
Freeman & Watson
Attorneys

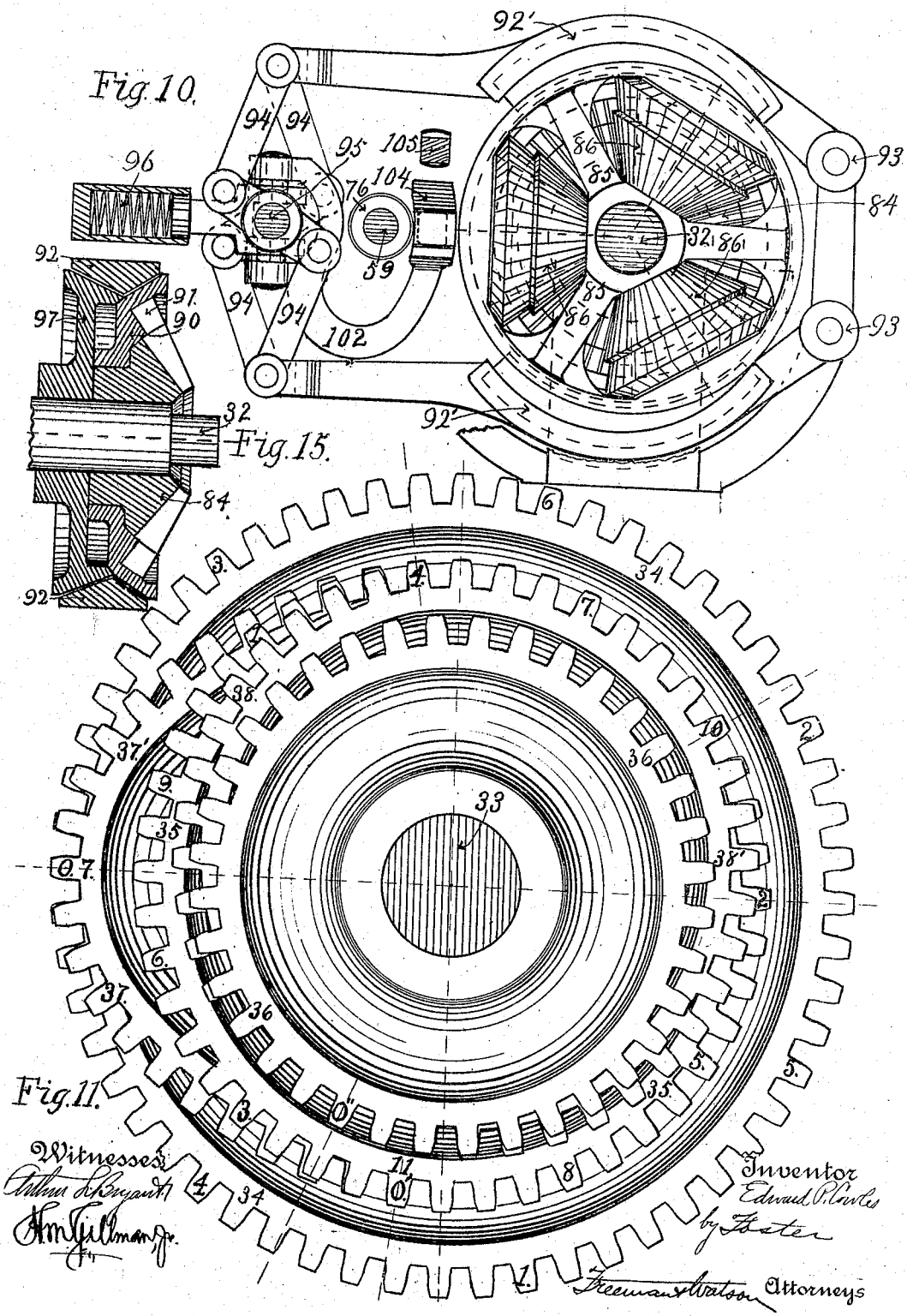

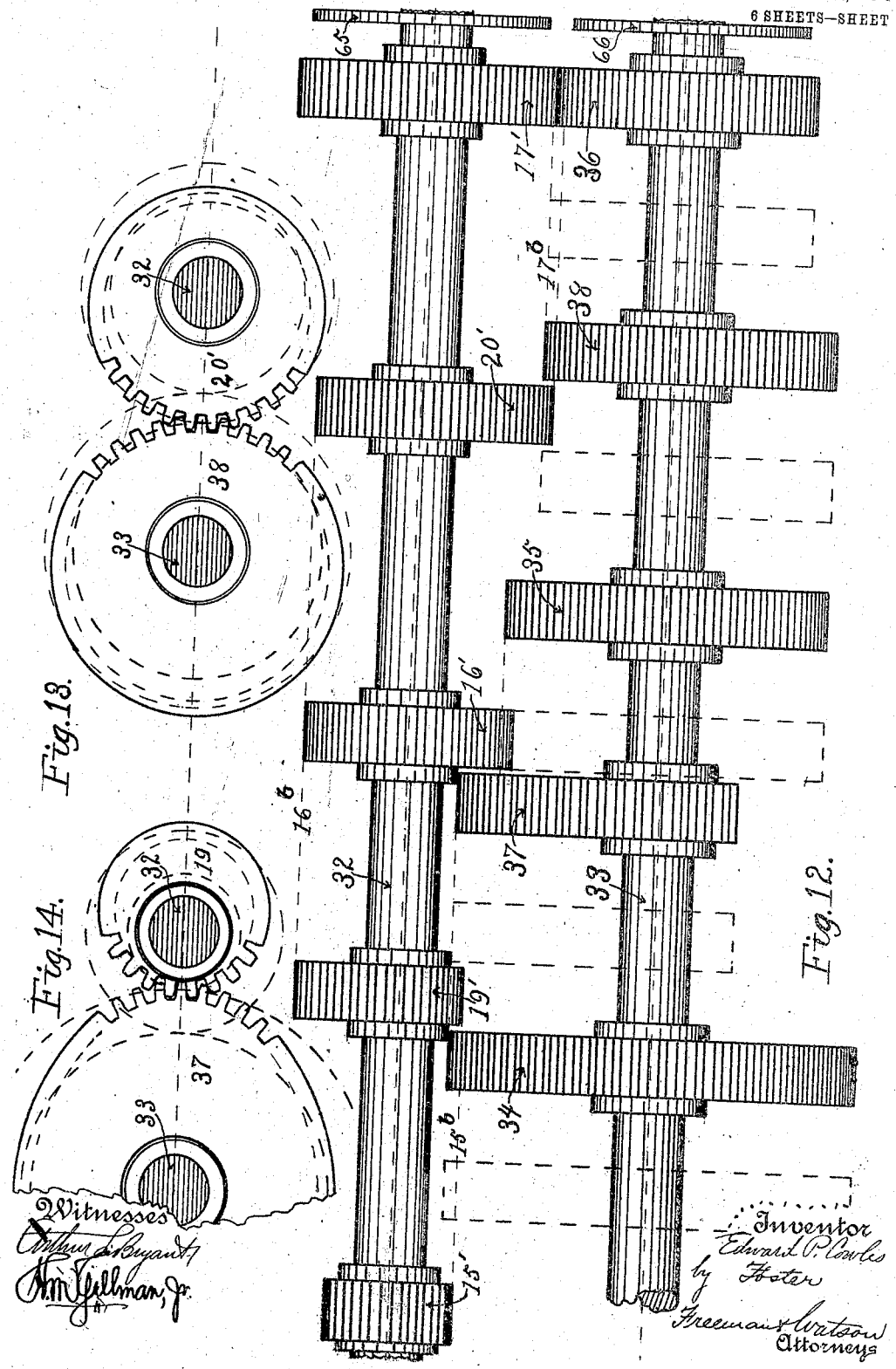

UNITED STATES PATENT OFFICE.

EDWARD P. COWLES, OF LANSING, MICHIGAN.

VARIABLE-SPEED-TRANSMISSION GEAR.

939,589.                Specification of Letters Patent.    Patented Nov. 9, 1909.

Application filed September 5, 1903.   Serial No. 172,106.

*To all whom it may concern:*

Be it known that I, EDWARD P. COWLES, a citizen of the United States, residing at Lansing, in the county of Ingham and State of Michigan, have invented certain new and useful Improvements in Variable-Speed-Transmission Gear, of which the following is a specification.

This invention relates to change speed transmission gears having a stopping and reversing device, and an operating lever combined therewith, and has for its object— to provide means for shifting the power transmission from one pair of spur gears to another pair of different diametrical proportion, without disengaging, coupling, or uncoupling any part, also to provide means for changing the relative speed of the parts, while in transition from one pair of gears to another, so that they will be in unison with the relative speed of the last pair.

It has also for an object, to provide a stopping, breaking, and reversing device (when the invention is used for motor vehicles, propelled by nonreversing and stopping motors,) that acts without disconnecting any part, and in braking throws the momentum of the vehicle in opposition to the motor.

It has further for an object, to provide an operating lever, which after performing one function, while moving continuously in the same direction, locks and remains neutral to this function, while performing other duties.

It consists first in providing an eccentric, or curved geared path intermediate between gear wheels of different diameters, secured to the same shaft, said geared path leading from the pitch line of the larger gear to the pitch line of the smaller gear and vice versa, and over which path a pinion or coacting eccentric geared path, intermediate between coacting gear wheels secured to another shaft, can travel from engagement with the larger gear to engagement with the smaller gear, or vice versa, without disengaging, and thus changing the relative speed without shock between coacting gears in transit over geared paths. Second, in providing means for automatically shifting the moving gear wheel or wheels at the proper moment. Third, in means for automatically preventing the moving gear wheels or wheel from being shifted except at the proper moment. Fourth, of means to cause the shifting mechanism to act instantly. Fifth, of means for automatically locking the shifting mechanism at each successive stage of its movement. Sixth, of means whereby an operating lever, after shifting the gears, locks and remains neutral relative to the shifting mechanism, and operates the stopping, braking and reversing mechanism by a continuous movement in the same direction. Seventh, in means whereby the relative action of gears in a differential mechanism, placed in the motor shaft, are shifted to either neutralize or reverse the action of the motor on the transmission gears, to the extent of stopping, retarding, or reversing their movement.

The invention consists, further, in various improvements in the construction, and arrangement of parts, and specific devices for effecting the various movements, all of which will be fully described in the following specifications, reference being had to the accompanying drawings in which:—

Figure 4:
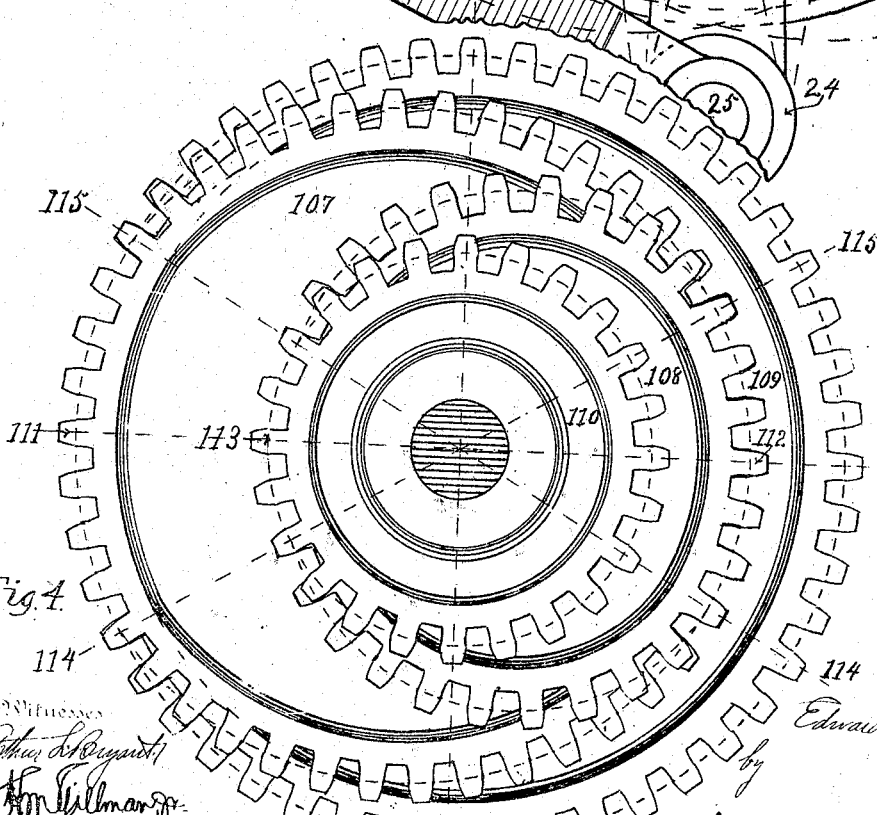

Figure 1 is a top view of a single geared transmission embodying my invention. Fig. 2 is a view of the right side of the cone of gears shown in Fig. 1, or of the left side of upper gear cone shown in Fig. 5. Fig. 3 is a view from the right side of Fig. 1, partly in section, and with part of the shifting gear removed. Fig. 4 shows a different arrangement of eccentric gears from that shown in Fig. 2. Fig. 5 is a top view of a double geared transmission embodying my invention, with horizontal section through shifting and reversing mechanism. Fig. 6 is a side view of the shifting rod and operating lever shown in Fig. 5, with parts cut away. Fig. 7 is a view from the right side of Fig. 5, with the reversing mechanism removed. Fig. 8 is a view from the left side of Fig. 5, with transverse vertical section through shifting drum. Fig. 9 is a longitudinal vertical section through the shifting drum, on line A—A of Fig. 8. Fig. 10 is a view of the right side of reversing mechanism, with front gear and friction sheave removed. Fig. 11 is a view of the right side of lower cone of gears shown in Fig. 5. Fig. 12 is a top view of a direct double geared transmission embodying my invention. Figs. 13 and 14 are side views of the coacting eccentric gears shown in Fig. 12. Fig. 15 is a section through double friction sheave a modification of sheave 90 in Fig. 5.

Referring to the drawings, 15, 16 and 17,

Fig. 1, indicate spur gears of different diameters secured to a shaft 18. Between these gears, and also secured to shaft 18, are two eccentric gears 19, 20 which are respectively of a pitch diameter intermediate between the pitch diameters of gears 15 and 16 and gears 16 and 17. Said gears 19, 20 are bored out eccentric so that when they are secured to shaft 18, their pitch lines are even, at diametrically opposite points, with the pitch lines of gears 15 and 16 and 16 and 17 respectively, as shown at 15$^a$, 16$^a$ and 17$^a$ Fig. 2. All of these gears have teeth of the same pitch, and preferably of an even number, with those in the regular gears divisible by 4. They are placed with respect to each other, so that the teeth at the diametrically opposite points, where the eccentric and regular pitch lines are the same distance from center of shaft 18, will coincide and form practically a continuous tooth, as at 15$^a$, 16$^a$, 17$^a$, Fig. 2. For convenience in description this tooth will be called the "shifting tooth" and the one on the opposite side of the eccentric where the pinion is shifted from the eccentric onto the regular gear the "landing tooth". It will be seen that for some distance either side of this tooth the teeth will practically coincide as shown between the broken radial lines 21 and 22, Fig. 2, which in the present instance is a ⅛ segment of the gear wheel. It is obvious that a pinion engaged with one of the regular gears while passing over this segment could be shifted onto an adjacent eccentric or vice versa. Shaft 18 of this cone of gears has bearings in the outer ends of rocker arms 23 Fig. 3, extending from a rock shaft 24, turning on spindle 25, secured to the frame 26, of the transmission gear. This adapts arms 23, to swing to a limited extent as shown by broken lines Fig. 3, and move the cone of gears to or from a fixed line in frame 26 or the pinion shaft 29.

A pinion 27, preferably the driver, is adapted to engage with any of the gears 15, 16, 17, 19, 20 through an extensible connection with the driving shaft. This is accomplished by the motor shaft terminating in a sleeve 28, in which slides a short shaft 29, having pinion 27, secured to its outer end, which is supported by a bearing 30, arranged close to the pinion 27, and having a sliding connection with the frame 26, in line with shaft 29, and sleeve 28. Shaft 29 is rotatively connected to sleeve 28, by having two or more concave slots cut in its surface in the direction of its length which register with similar slots cut in the inner surface of the sleeve 28, and in which slots are placed balls 31, so that the shaft slides in and out of sleeve 28, under the severest turning effort practically without friction.

In Fig. 1 pinion 27 is represented as being in engagement with the central regular gear 16, with the shifting tooth 16$^a$ of this gear on a line connecting the two axes. It is obvious from the foregoing description that in this position, while in operation, it can be shifted to the right onto eccentric gear 19, and if shaft 24, with arms 23, is rocked to move shaft 18, toward pinion 27, the latter will follow down the eccentric geared path until the shifting tooth diametrically opposite is in line with the axis when pinion 27, can be shifted onto regular gear 15. If the pinion when in the position shown in Fig. 1 be shifted to the left onto eccentric gear 20 and shaft 18 moved away from pinion 27, said pinion will follow up eccentric geared path 20, and can be shifted onto regular gear 17. It is also obvious that if the movement commences when shifting teeth 15$^a$ and 17$^a$ are opposite pinion 27 the reverse of these movements will take place.

It will be seen from the foregoing that pinion 27, can be shifted at will from one regular gear to any other without disconnecting any part,—changing the speed gradually in transit over the eccentric gear paths without shock.

The means for automatically shifting the gear is substantially the same, and can better be described in connection with Figs. 5, 6, 7, 8, 9, 11, which represent a double geared transmission.

In Fig. 5, the cone of gears 15′, 16′, 17′, are the same as 15, 16, 17, in Fig. 2, except in diameter, and for convenience will be referred to as the same. In Fig. 5 it is preferably the driver, and connected to the motor shaft 32. Rigidly supported in the same frame is another shaft 33, extending parallel with motor shaft 32 and having secured thereon gear wheels 34, 35, 36, of different diameters, placed in the same rotating planes respectively with 15′, 16′, 17′. Intermediate irregular eccentric gears 37, 38, are secured to shaft 33, opposite to 19′, 20′, respectively. All of these gears have teeth of the same pitch, and the sum of the teeth in each pair 15′ and 34, 16′ and 35, 17′ and 36, are equal. In the present instance there are seventy two teeth in each pair so that the pitch lines in each pair are the same distance apart, and an intermediate or "idle" pinion 39, having its axis in the same plane with the two shafts 32 and 33 will intermesh with both wheels of either of the three pairs of gears. Pinion 39, has bearings in the outer ends of arms 40, extending from a shifting drum 41 turning to a limited extent and sliding lengthwise on a shaft 42, which is supported in bearings, 43, in the frame of the transmission. Pinion 39 is thus adapted to shift and swing to engage any of the pairs of gears, as shown by broken lines in Fig. 8.

It is necessary that the number of teeth in the wheels of each pair, and the pairs, should bear certain relations to each other. Pinion 39 being an intermediate or idle gear, the effect is the same as if the wheels on the shafts 32, 33 intermesh directly with each other and for convenience will be so considered. Pinion 15' has sixteen teeth, 16' has twenty-eight teeth, and 17' has thirty-six teeth, therefore eccentric 19' will have twenty-two teeth—eleven on each half, and 20' will have thirty-two teeth—sixteen on each half. Gear 34 has fifty-six teeth and pinion 15', when engaged with it will therefore make $3\frac{1}{2}$ revolutions to every one made by said gear. Let the shifting tooth of pinion 15' be at 0 on gear 34 Fig. 11, the first revolution will take it to 1, the second to 2, the third to 3, the fourth it passes 0 and goes to 4, and so on. At the 7th revolution it is again at 0. It will be seen that there are seven teeth in gear 34, on one of which the shifting tooth of pinion 15' will land every 7th revolution, and that it will never during such cycle mesh with any of the others of said series of seven which for convenience in description will be called "multiple teeth".

The intermediate geared path 37, is a curve such that the pitch line with that of eccentric gear 19' at each succeeding pitch will be the same distance apart on a line joining the two axes. It has 22 teeth, 11 on each half, from 0 on gear 34 to the point where it is even with the pitch line of gear 35, to correspond with eccentric 19', on shaft 32, with which it coöperates. (It does not extend entirely around). When the shifting tooth in pinion 15' is at 0, on gear 34, intermediate pinion 39, can be shifted between, and bring eccentrics 19' and 37 into engagement, and after running down eleven teeth will bring the diametrically opposite shifting tooth 16ª, in pinion 19', to 0, on gear 35, Fig. 11, and intermediate gear 39, can be shifted to bring gears 35, and 16' into engagement. Gear wheel 36 has forty-four teeth and pinion 16' with twenty-eight teeth will make $1\frac{4}{7}$ revolutions to every revolution of gear 36. The first revolution will take shifting tooth 16ª in pinion 16', to 1, on gear 36 the second to 2, and so on, until at the eleventh revolution it will be at 0 again, making eleven "multiple" teeth in gear 36, with one of which the shifting tooth on pinion 16' will engage every eleventh revolution. In making the reverse movement passing from gear 35 back to gear 34, it is necessary to place the other half of geared path 37, over which pinion 39, passes in this movement, so that it will start from a "multiple" tooth on gear 35 and land on a "multiple" tooth on gear 34 and where it will not interfere with the other half. In the present instance tooth 4 on gear 35, and 0 on gear 34, are the only ones, the correct distance apart—that is—eleven pitches on pitch curve 37. Tooth 0 is also shifting tooth on gear 34 which makes geared path 37, in this instance, continuous. When pinion 16', has made five revolutions after landing on 0' in gear 35 it will be in position at 4 to be shifted and it will be in this position every eleventh revolution thereafter. Tooth 4 is established as shifting tooth for gear wheel 35.

It is desirable in an intermediate gear like 35, to shift from the same tooth to either side eccentric gear. For this reason curved path 38 which co-acts with eccentric 20' on shaft 32, and leads to gear 36, on shaft 33, starts from shifting tooth 4 on gear 35. As eccentric 20' has thirty-two teeth—curved path 38 has thirty-two teeth also, sixteen on each half, and lands on tooth 0" in gear 36, Fig. 11, sixteen pitches on curve 38 from tooth 4 in gear 35, and this tooth is established as shifting tooth for gear wheel 36. As this gear has the same number of teeth (thirty-six) as gear 17', on shaft 32, with which it co-acts, there are no multiple teeth, the shifting tooth in gear 17', returning to 0 in gear 36 in every revolution. For this reason the half of curved path 38' which leads back to gear 35 must start from this tooth, which makes curved path 38 continuous like 37, sixteen pitches from tooth 0" in gear 36, along curve 38' lands at tooth 10—a multiple tooth in gear wheel 35, where intermediate pinion 39 can be shifted to bring gears 35 and 16' into engagement again, and after five revolutions, shifting tooth in pinion 16' will coincide with 4 in gear 35, and every eleventh revolution thereafter will be in position to be shifted either way. Shaft 32 makes from six hundred to three hundred revolutions per minute so that eleven revolutions will make a delay of only from one to two seconds, which is not appreciable.

It will be seen from the foregoing that in changing from one gear wheel to another either way they are never out of mesh or disconnected in any manner, therefore they work with the same precision and absolute certainty as regular gears. It is impossible for them to get out of unison or go wrong. It will also be seen how many combinations can be worked out, varying in diameter, ratio, and number of gears.

It will be observed that intermediate pinion 39, follows the eccentric gears, swinging automatically toward one shaft or the other as shown by broken lines in Fig. 8, and does not have to be kept in mesh by special mechanism as is the case in the single gear Figs. 1 to 3.

It is obvious that intermediate pinion 39 requiring to be shifted quickly, and at precisely the proper moment, and offering considerable resistance when under heavy pressure, it is necessary to provide means for automatically shifting it. In the present instance this is accomplished by the following described means.

The inner surface of shifting drum 41, is provided with inwardly projecting ribs 44, Figs. 8 and 9, in the form of an irregular double thread, forming two irregular spiral channels. Shaft 42 passing axially through this drum, and on which it slides and swings, has two diametrically opposed arms which are provided on their outer ends with rollers 45, which run in the channels formed on the inner side of drum 41. These channels are arranged with two diametrically opposed straight parts, which in Figs. 8 and 9 are above and below, and two diametrically opposed diagonal parts, which in the same figure are on the sides. To shift pinion 39 from one pair of gear wheels to another, shaft 42 makes one revolution. When not shifting, or when the gears are working, shaft 42 remains at rest in the position shown, with the rollers 45 in the straight part of the channels. This prevents drum 41 from moving when gears are working regular, or locks it, and offers no resistance to shaft 42 when starting to turn. When shifting the gears shaft 42 starts to turn at the instant shifting teeth in gears are in proper position with respect to each other—rollers 45 strike the diagonal part of channels, and move the drum accurately the distance from the center of one set of gears to the center of the adjacent set, while intermediate pinion 39, is passing over the $\frac{1}{6}$ segment between lines 21 and 22, Fig. 2. Rollers 45, then traverse the straight part of channels (drum 41 remaining stationary), while pinion 39, travels over the eccentric. When pinion 39, reaches the opposite $\frac{1}{6}$ gear segment between lines 21', and 22', rollers 45, again strike the diagonal part of channels, and move drum 41 the distance from the center of one set of gears to the center of the other set of gears, and shift intermediate pinion 39, from the then engaged eccentric to the adjacent regular gear. Rollers 45 are now in the straight part of channels again, which in the present case, would be one of the extreme end parts 46, 46', and shaft 42', is at rest again.

Shaft 42 is rotated by a pair of miters 47, one of which is secured to the end of this shaft close to the bearing 43, the other to the lower end of a sleeve 48 which turns on a stud 49, one end of which is secured in the bearing 43 of shaft 42, the other end having a T shaped sleeve 50, bearing on shaft 32. Turning loosely on the ends of this T shaped sleeve, concentric with shaft 32, are two miter gears 51, 51' which mesh with a third miter 52, secured to the upper end of sleeve 48, (for the sake of clearness in illustration this miter in Figs. 1 and 5 is shown with its axis horizontal, it is however at an angle of nearly 45 degrees, as in Figs. 3 and 7). Miters 51, 51', have on the outer face of their hubs two clutch members 53, 53' disposed, diametrically opposite each other, adapted to engage similar clutch members 54, 54' on two sleeves 55, 55'—splined to shaft 32, and sliding freely thereon (best shown in Fig. 7). Sleeves 55, 55' are connected by a yoke 56, which holds them normally out of engagement with the clutch members on miters 51, 51', but when moved to the right or left slides one or the other of said sleeves 55, 55' into engagement with its respective miter and causes it to revolve with shaft 32, while the other miter turns loosely on sleeve 50 in the opposite direction. Yoke 56 is moved by a lever 57, to which it is pivoted. One end of lever 57, is pivoted to a boss 58, extending from sleeve 50; the other end extends to the shifting rod 59, where it engages with one of a series of notches 60, cut in a projection from rod 59, which extends up through a slot in a bearing 61, for rod 59. Two inclined projections 64, 64' on the bearing 61, serve to disengage the end of lever 57, from notches 60, as it swings out either way, and allow it to move back into its normal position. That is as the lever 57 is moved about its pivot in either direction from the position shown in Fig. 5, the notched projection on the rod 59 moving through the slot in bearing 61, it will contact with one of the inclined projections 64, 64' and be thereby lifted from the notch 60 in which it has previously rested. Miters 51, 51', are each provided with a projection 62, 62' which pass yoke 56, at the same time, and yoke 56 is provided with two beveled projections 63, 63', separated a distance that will just allow projections 62, 62' on the miters to pass between them without touching when said yoke is in its normal central position, but when yoke 56, is moved to either side by lever 57 as described above the projection extending from the miter on the opposite side of said central position from which the yoke is moved, strikes the beveled projection on yoke 56, and throws it into its normal central position, disengaging the clutch members previously engaged. Such return movement will move the lever 57 from the beveled projection 64, 64' by which it has been supported to its normal position when it will again engage one of the notches 60 of the bar 59.

It will be observed that the foregoing is simply a "one turn" movement, that can be made to turn with shaft 32, or in a reverse direction, and after making one turn automatically disengages.

In operation if shifting rod 59 is moved to the left at the instant that shifting teeth in regular gears 35 and 16' are on a line joining the axes of shafts 32 and 33, (which is in the position shown in Fig. 5, the intermediate pinion being engaged with central regular gears 35 16') the end of lever 57 being engaged in one of the notches 60 in shifting rod 59, this lever with yoke 56, and sleeves 55, 55', will be carried to the left. which will bring the clutch members 54', and 53', into engagement and cause miters 51'—52 to revolve with shaft 32. This rotation by means of sleeve 48, and miters 47, is communicated to shaft 42. Rollers 45, strike the diagonal part of channels in shifting drum 41, and force it to the left, which slides intermediate pinion 39, between—and into engagement with eccentric gears 37, 19'. While rollers 45 are traversing the straight part 65 of channels—intermediate pinion 39, will run down between eccentrics 19' and 37 and when shifting teeth in pinion 15' and gear 34 are in line, rollers 45 will strike the diagonal part of channels again, and force shifting drum 41 with intermediate pinion 39 farther to the left and bring the latter between, and into engagement with regular gear 34 and pinion 15'. Rollers 45 are now in the straight part of channels 46' at the right end of shifting drum 41. Shaft 42, and miters 47, 52, having completed one revolution, projection 62' on miter 51, strikes the beveled part 63' of yoke 56 and throws it to the right disengaging miter 51', which with shaft 42 comes to rest and remains so until shifting rod 59, is moved again.

It is obvious that if shifting rod 59 is moved to the right instead of to the left, it will bring sleeve 55, and miter 51, into engagement and cause a reverse movement of shifting drum 41, and intermediate pinion 39 from that just described.

It is obvious that as an attempt to shift the gears except at the proper moment would result in damaging or breaking the parts, it is necessary to provide means whereby the shifting mechanism will act when the gears are in proper relation to each other. This is accomplished in the present instance by securing disks 65 and 66 to each shaft 32 and 33. On shaft 32, disk 65, has two notches 67, 67', cut in its edge (Fig. 7). Notch 67, is placed in line with or a little in advance of shifting tooth 16ª, in pinion 16' and notch 67' is placed diametrically opposite, being in line with or a little in advance of shifting teeth 15ª and 17ª, in pinions 15' and 17' (Figs. 2 and 5). Disk 66, on shaft 33 has three notches cut in its edge, one 68 being in line with or a little in advance of, shifting tooth 0 in gear 34, the second 69, being in line with or a little in advance of, shifting tooth 0' in gear 35, and the third, 70, being in line with or a little in advance of shifting tooth 0'' in gear 36, there being one notch for each regular gear wheel. Shifting rod 59 is provided at its end adjacent said gears with a fork, each member of which has projections 71, 71', and 72, 72' which are of shape and size as to just pass through the notches in disks 65 and 66. The edges of these projections and the sides of the notches in said disks have knife edges so that they cannot abut. The projections extend on either side of the disks, and are spaced apart to allow the disks to revolve freely between them. It is obvious from an examination of Figs. 5 and 7 that the shifting rod 59 cannot be moved except when a notch in each disk is on a line joining the two axes, which will allow projections 71 and 72 to pass through said notches. It will be seen, by consulting Fig. 11 and tracing the movement of the multiple and shifting teeth, first, that when any one of the pairs of regular gears are in mesh, the notch in disk 66 which corresponds to said gear will never come in line with a notch in disk 65, except when the shifting teeth in said pair are in line and, therefore, in proper position for the intermediate pinion, 39, to be shifted:—second, that when any one of the pairs is engaged the notches in disk 66 corresponding to the other pairs will never under any conditions come in line. Therefore, it is impossible to move shifting rod 59 and set the shifting mechanism in operation except when the parts are in the proper relation to each other for so doing. The office of the disks is to dictate the proper time for shifting the gears, and prevent their being shifted at any other time.

When shaft 32 revolves at a high speed the notches in disks 65 and 66 would pass so quickly that the movement of a hand lever would be too sluggish to pass projections 71, 72, through the notches. It is necessary to provide means to do this instantly. This is accomplished in the present instance by making shifting rod 59 in two parts connected by a spring 73, in the manner of the buffer spring in car couplings. The end of the square part 59, is rounded with a loose fitting collar 74, resting against the square shoulder. The outer end of round part is headed over another loosely fitting collar 75, with the spring 73 at some tension between said collars. Part 59', has a casing 76, extending over the spring—hooking over collar 74 and abutting against collar 75. If part 59' is moved either way, when part 59 is fast, the spring 73 is compressed. When part 59 is free it acts like a solid rod. The shifting lever 77, is provided at the handle end (not shown) with notches and latch like the reversing lever in locomotives, one notch for each speed.

In operation when it is desired to shift to another speed, for instance to the left, shifting lever 77 is pulled over into the next notch at any time. The projections 71' 72' cannot pass disks 65 and 66, until the proper notches coincide therewith; but are pressed against them. Spring 73 is thereby compressed, and when said notches are in alinement with the projections 71′ 72′ the latter are shot therethrough instantly, throwing coupling members 54′ on collar 55′, into engagement with miter 51′. It will be observed that collars 55 and 55′ and all moving parts are loose when not in operation, and spring 73 has only to overcome the inertia of the parts, which are light. It will also be observed that as hereinbefore stated when the shifting mechanism starts to move, the rollers 45, in shifting drum 41, are in the straight part of channels 65 and these with all other parts of the shifting mechanism are under no stress, and offer no resistance to starting except inertia so that the impact of coupling members 53 and 54 is light. At 600 revolutions per minute, it would be the same as a body of the same weight falling only 10 inches.

To lessen friction the shifting drum 41 can have rollers 78 running on shaft 42.

The shifting mechanism illustrated in Figs. 1 to 3 is substantially the same as that shown in Fig. 5. Miter 52 is integral with shifting drum 41 which revolves shaft 42′ with rollers 45′ being stationary. Shaft 42′ is pivoted to frame 26 at 78, adapting it to swing to a limited extent. It is tubular and stud 49 with the hub of miter 52 telescopes with it. In turning, the effect of inside channels or rollers 45 is to rock shaft 24 and move the cone of gears to or from pinion 27, and keep it in mesh with the eccentric gears. Drum 41 has projections 79 forming an irregular channel outside with which engages a roller 80, attached to one arm of a bell crank 81 pivoted to an arm 82 integral with the pivot head of shaft 42′. The other arm of this bell crank is connected by a link 83 to the sliding bearing 36, of pinion 27. (For clearness in illustrating, in Fig. 1 drum 41 is shown horizontal and crank 81 and link 83, above shaft 29, instead of inclined and below as in Fig. 3). In turning, the effect of channel on outside of drum on roller 80, is to slide pinion 27. The curves of these channels 44 and 49 are so shaped and combined that the first effect of rotating drum 41, is to slide pinion 27, during which movement inside channel remains neutral on rollers 45. Rolls 45 then strike the slanting part of inside channel 44 and move the cone of gears to or from pinion 27, causing it to follow the eccentric gears. During this movement roller 80 traverses a return bend in outside channel (shown by broken lines on under side of drum 41 in Fig. 1) which causes bell crank 81 and pinion 27 to remain stationary, while drum 41 moves to or from shaft 29, and lastly rollers 45 reach the straight part of inside channel and remain neutral again, while roller 80 strikes the second slant in outside channel and slides pinion 27 from an eccentric to a regular gear, which completes a revolution of drum 41.

The movement of the shifting mechanism is controlled the same as in Fig. 5, except there is only one disk, similar to 65 on shaft 32. To prevent projections 71, 71′, going through either notch indifferently, one notch is wider, and not so deep as the other, and projection 71 is shorter and wider than 71′.

It will be observed that this gear cannot be disconnected to stop, or be reversed, and when used in connection with a motor that cannot be reversed, or conveniently stopped, it is necessary to provide means in one of the shafts to do so. Preferably I accomplish this by the mechanism shown in horizontal section to the right in Fig. 5, and in Fig. 10. Shaft 32 is in two parts, on the abutting ends of which are secured two beveled gears 84, 84′, facing each other, and between them is a spider 85, turning loosely on the abutting ends of the sections of shaft 32, and carrying preferably 3 pinions, 86, whose axes are radial to shaft 32 and 120 degrees apart and which pinions are always in mesh with the bevel gears 84, 84′—the arrangement being much the same as the common differential gear. Pinions 86 each turn on a sleeved nut 87, the out ends of which are provided with pinions 88. This sleeved nut is fitted to and turns to a limited extent on a threaded stud 89 connecting the periphery and hub of spider 85. On the outside of beveled gears 84, turning loosely on the hubs thereof or shaft 32, are two friction sheaves 90, 90′ provided on their inner sides with beveled gear teeth 91, which are always in mesh with sleeve nut pinion 88, forming practically another differential gear outside of the first. The effect of turning sleeved nut 87 up is to bind differential pinion 86 as in a vise and obstruct or prevent its turning. Friction sheaves 90, 90′ are each provided with two brakes 92, 92′, one above and one below, and each having one end pivoted to the frame work at 93 and the other end connected by links 94 to the arms of an operating rocking shaft 95. Normally the brakes to both sheaves are off or free from sheaves 90, 90′, leaving them to turn freely with shaft 32. A spring 96 is arranged to cause them to return automatically to this position when released. When rock shaft 95 is turned—for instance to the right (Fig. 10) it draws the brakes 92′ nearest the observer in Fig. 10, or to the right in Fig. 5, together and causes them to embrace sheave 90′ like a vise or tongs, while the other pair is opened wider. Turning rocker 95 to the left has the reverse effect— embracing sheave 90 and opening wider from sheave 90′. In operation assuming that sleeve nuts 87 are turned up to hold differential pinions 86, from revolving, they act to transmit power directly from bevel 84' to bevel wheel 84, the latter revolving in the same direction as the former, shaft 32 acting as though it were unbroken. If rocker 95 is turned to the right it will bring brakes 92' to bear on sheave 90' and resist its revolving. This resistance, by means of gear teeth 91', reacts on sleeve pinion 88, and if sufficient pressure be applied it will turn sleeve nut 87 back jamming it against the rim of spider 85 and releasing differential pinions 86. If the brakes are now released the transmission gears will stop, spider 85 with differential pinions 86, revolving with half the velocity of the motor shaft and in the same direction, but if the pressure of brakes 92' be continued it acts to resist the revolution of spider 85, (friction sheave 90' and spider 85 being locked together by reason of sleeve pinion 88 jamming against rim of spider) and this resistance reacts equally against the momentum of the transmission gear and power of the motor. Pinions 86 act as levers of the first order with sleeve nuts 87 as fulcrums. In other words the power of the motor acts to stop and brake, the forward movement of the transmission gearing and vehicle. By regulating the pressure, allowing sheave 90' to slip in the brake, this resistance can be increased or diminished at will, and if sufficient pressure be applied to stop and hold sheave 90' and spider 85 from revolving, the movement of the transmission gearing and vehicle will be reversed. If now rocking shaft 95 be turned to the left, brakes 92' will be released from sheave 90' and the other pair 92 brought to bear on sheave 90, and the resistance caused thereby is transmitted through gear teeth 91 and pinions 88 to sleeve nuts 87 causing them to screw up on threaded studs 89, and compress against differential pinions 86, obstructing their revolution and changing them and spider 85 from transmission pinions (levers of the first order) to neutral transmission blocks (angular levers of the third order)—receiving power on one side from bevel wheel 84' and transmitting it to bevel wheel 84 on the other.

In rare cases (backing down hill for instance) it would be desirable for brakes 92, to resist the transmission gears turning independent of the differential mechanism, for this reason I would preferably make sheave 90 double, as shown in Fig. 15, with a V-shaped face so that brake 92 would act on both parts, the outside part 97 being secured directly to shaft 32.

It will be observed that in this device the gears are never out of mesh or disconnected in any manner. The power is not transferred by throwing one set of gears out of action and bringing another set into action as is the case in the common "slipping" change gears. Neither is the action of one set of gears neutralized and the action of another set made effective, as is the case in planetary or epicycle gears, but in this case the relation of the same gears to each other, is changed to produce different results. The action of friction sheaves 90, 90' is to cause spider 85 with differential pinions 86, to revolve with shaft 32 with the same speed, to revolve with shaft 32 with one half its speed, or to remain stationary, which produces the result of straight transmission, stopping or reversing.

In a controlling mechanism it is desirable to cause all the operations to be performed by one lever, and to have the movement of that lever a simple movement back and forth, without shifting it in any manner. Preferably instead of swinging controlling lever 77, on a pivot 98 as is the general practice, I sustain it between two arc guides 99, having in each, two arc slots, 100, 100' with 98 as a center. The bent foot 77' of lever 77, is provided with pins 101, 101', which work in these slots and cause lever 77 to swing as if pivoted at 98, as shown by broken lines in Fig. 6. (It will be understood that the only object in making slots 100 curved instead of straight and horizontal is to cause the handle end of lever 77 to move farther than the foot, and give it leverage). Shifting rod 59' is pivoted to pin 101. The movement of pin 101 in slot 100 is practically horizontal and during this movement lever 77 operates the shifting mechanism. When pin 101 reaches the left end of slot 100, the lower pin 101' is free to move out in a branch 100'' of lower slot 100', with pin 101 in this position as a center, during which movement lever 77 swings on pin 101 as a center, this pin remaining stationary, locking the shifting mechanism.

Rocking shaft 95 is provided with an arm 102 pivoted to swing like a latch horizontally, but rigid rotatively with it. It is pressed against a stop 103, by a spring on the opposite side. The outer end of arm 102 terminates in a hook latch 104, placed in the path of the ball end of an arm 105, extending from lever 77. After completing the movement of the shifting mechanism, a further movement of lever 77 to the left, will swing ball end of lever 105 in a circle, with pin 101 as a center, engaging latch 104 and operating the reversing mechanism. During this movement pin 101' moves in slot 100''. When lever 77 is moved to the right so as to bring pin 101' into slot 100', and pin 101 commences moving to the right, ball end of arm 105 is drawn out of latch 104.

In Fig. 12 I have shown my invention embodied in a system of direct meshing gears, that is, with intermediate pinion 39, Fig. 5, dispensed with the gears on shafts 32 and 33 meshing directly with each other. The gear wheels on each shaft are precisely the same respectively as those in Figs. 5, 7, 8 and 11, and the relative arrangement is the same except in this case they are spaced certain distances apart. The shifting teeth in gears on shaft 32 are in planes parallel with the axis shown by broken lines 15$^b$, 16$^b$ and 17$^b$ and the shifting teeth in gears on shaft 33, bear the same relation to each other as explained in connection with Figs. 5 and 11. The gears can be secured directly to the shafts and one or both of the shafts adapted to slide endwise to a limited extent or they can be secured to sleeves splined to the shafts adapted to slide endwise thereon. Preferably I would secure the gear wheels on shaft 32, directly on the shaft, which would not be adapted to slide endwise, and the gear wheels on shaft 33, to a sleeve adapted to slide thereon by frictionless means, either the one shown in connection with Figs. 1 and 3 or any other suitable form. They are assembled with the proper teeth intermeshing and as hereinbefore explained can never vary from such arrangement. In Fig. 12 I have represented regular gears 17' and 36 (the fast speed) in engagement with their shifting teeth on a line joining the axes, and as explained in connection with Fig. 5, gears on shaft 33 can be shifted to the left bringing eccentric gears 20' and 38 into engagement as shown in Fig. 13. After one half revolution of shaft 32 (during which time the pitch lines of eccentric 20' and 38 touch tangentially the point of contact moving toward shaft 32, reducing the speed of shaft 33) the gears on shaft 33 can be again shifted to the left, placing them in the position shown by broken lines in Fig. 12, and bringing regular gears 35 and 16' into engagement. When shifting teeth in these two gear wheels are in proper position, gears on shaft 33 can again be shifted to the left bringing eccentrics 37 and 19' into engagement as shown in Fig. 14, the pitch circles of which will touch each other for half a revolution of 19' the point of contact moving toward shaft 33 at which time gears on shaft 33 will be shifted to the left again, bringing regular gear 34 and pinion 15' into mesh. Or from gear 35, they can be shifted to the right bringing regular gears 36 and 17' into mesh again, as fully explained in connection with Figs. 5, 7, 8 and 11.

It will be observed that the reason for leaving a space between the gear wheels is that gear 36 cannot pass eccentric 20' nor eccentric 38 pinion 16' to the left, gear 35 cannot pass pinion 20' and gear 37 cannot pass 16' nor can gear 34 pass 19' to the right.

Shifting the gears is accomplished by substantially the same means as shown and described in connection with Figs. 5, 6, 7, 8 and 9. This arrangement has the advantage of simplicity but is not so compact as that shown in Fig. 5.

In Fig. 4 I have shown a different arrangement of eccentric gears from that shown on shaft 18 Fig. 1 and shaft 32, Figs. 5 and 12. In this case I place two eccentric gears 107, 108 between two regular gears 109, 110 of different diameters. The diameter of the larger eccentric is ¼ the difference between the diameters of the two regular gears less than the diameter of the larger regular gears. The diameter of the smaller eccentric is ¼ this difference greater than the diameter of the smaller regular gear. They are placed so that the highest shifting tooth of the larger eccentric 111 is even and coincides with the shifting tooth of the larger regular gear 109, and the lower shifting tooth 112 (diametrically opposite 111) is even, and coincides with the highest shifting tooth of the smaller eccentric—the lowest shifting tooth 113 of this eccentric (diametrically opposite 112) is even and coincides with the shifting tooth of the smaller regular gear 110. It is obvious that a gear wheel meshing with the larger regular gear 109 could be shifted at 111 onto the larger eccentric, and after ½ revolution, again shifted onto the smaller eccentric at 112, and again after ½ revolution shifted onto the smaller regular gear 110, at 113 occupying an entire revolution in passing from one to the other, changing the speed gradually all the way. It is also obvious that the reverse can take place— passing from the smaller to the larger increasing the speed gradually all the way.

It will be noted that the pitch lines of the eccentric from 111 to 113 is practically a conical helix or spiral, and could be a true conical helix if it were not for the necessity of offsetting at 112, to allow the returning helix to pass. Any number of eccentric gears can be placed in this manner between two regular gears of different diameters and the transition made as gradual as desired. In Fig. 4 it is shown how the eccentric gears can be flattened at their junction with the regular gears, and with each other, so that the pitch lines and the teeth will coincide as between the radial lines 114, 115, in the present instance ⅙ of a circle.

It will be evident that many changes in the details of construction and arrangement of the apparatus hereinbefore described can be made without departing from the spirit and scope of my invention. Thus for instance other forms of one turn movements can be employed from the one shown. Many equivalent devices may be substituted to shift the gears from one to the other, and other means for regulating the shifting mechanism and prevent the gears being shifted at other than the proper moment. Various forms of cam movement can be introduced in place of the shifting drum shown. I intend in the broader claims of this specification to cover all such equivalent devices and in the more specific claims to cover the particular devices illustrated and described and which at the present time seem to be the best embodiment of my invention.

Preferably, as hereinbefore stated, I would arrange the shafts 32 and 33 parallel, as shown; but that is not necessary and they can be arranged to form a considerable angle to each other, the total number of teeth in each of the different pairs being different from the number in the other pairs so as to bring the pitch lines in each pair the same distance apart.

It is obvious that if the "shifting" and "multiple" points in the gears on shaft 33 have the form of teeth, or projections, the corresponding parts on the gears on shaft 32 will be spaces or sockets; but for convenience both have hereinbefore been termed "teeth."

In the embodiment of the invention illustrated in Fig. 12 the gears and eccentrics could be independently shifted and thereby the space occupied by the mechanism would be reduced. Preferably, however, as before described, they are all shifted simultaneously.

In the claims herein, the term "pinion" is intended to cover a toothed wheel or gear of any size.

The form of spur differential gears commonly in use may be employed in lieu of the gears 84, 84' hereinbefore described in connection with the other features of the present invention if desired.

Having thus described the invention, and without intending to limit them to the exact details of the embodiment thereof herein illustrated, what is claimed and desired to be secured by Letters Patent is:

1. In a variable speed gear mechanism, the combination of two elements geared together and each comprising a plurality of gears of different diameters, constantly connected to a common rotatable member, the gears of one element being arranged in reverse order to those of the other and each gear adapted to act with a particular gear in the other element, and means for transferring the connection between said elements from one of said coacting pairs to another without interrupting such connection.

2. In a variable speed gear mechanism, the combination of two elements geared together and mounted to rotate about parallel axes, each element comprising a plurality of gears of different diameters, each arranged concentric with its axis, and one or more gears arranged alternately of those aforesaid and eccentric to said axis, each gear being arranged to act with a particular gear in the other element, and means for transferring the connection between said elements from one of said coacting pairs to another without interrupting such connection.

3. In a variable speed gear mechanism, the combination of two elements geared together and mounted to rotate about parallel axes, each element comprising a plurality of gears of different diameters, each arranged concentric with its axis, and one or more gears arranged alternately of those aforesaid and eccentric to said axis, each intermediate eccentric gear having two shifting teeth which, respectively, aline with a tooth in each of the adjacent concentric gears, the concentric gears of one element being arranged reversely to the similar gears of the other element and each gear being arranged to act with a particular gear of the same form in the other element, means for rotating one of said elements, means for shifting the connection from a coacting pair of concentric gears to an adjacent pair of coacting eccentric gears, and vice versa, when the shifting teeth of said pairs are in alinement, and means for preventing such shifting when the said teeth are out of alinement.

4. In a variable speed gear mechanism, the combination of two elements geared together and mounted to rotate about parallel axes, each element comprising a plurality of gears of different diameters, each arranged concentric with its axis, and one or more gears arranged alternately of those aforesaid and eccentric to said axis, each intermediate eccentric gear having two shifting teeth which, respectively, aline with a tooth in each of the adjacent concentric gears, the concentric gears of one element being arranged reversely to the similar gears of the other element and each gear being arranged to act with a particular gear of the same form in the other element, means for rotating one of said elements, means for shifting the connection from a coacting pair of concentric gears to an adjacent pair of coacting eccentric gears, and vice versa, when the shifting teeth of said pairs are in alinement, and means acting on both said elements for positively preventing such shifting when said teeth are out of alinement.

5. In a variable speed gear mechanism, the combination of two elements geared together and each comprising a plurality of gears of different diameters, the gears of one element being arranged in reverse order to those of the other and each gear adapted to act with a particular gear in the other element, a lever, means adapted to be actuated by said lever for transferring the connection between said elements from one of said coacting pairs to another without interrupting such connection, and means for preventing such shifting until the parts are in a particular relation.

6. In a variable speed gear mechanism, the combination of two elements geared together and each comprising a plurality of gears of different diameters, the gears of one element being arranged in reverse order to those of the other and each gear adapted to act with a particular gear in the other element, a lever, means adapted to be actuated by said lever for transferring the connection between said elements from one of said coacting pairs to another without interrupting such connection, a disk connected with each of said elements, and means normally engaging said disks and lever to prevent such shifting, except when the parts occupy a particular relation, said means permitting adjustment of the lever at any time.

7. In a variable speed gear mechanism, the combination of two elements geared together and each comprising a plurality of gears of different diameters, the gears of one element being arranged in reverse order to those of the other and each gear adapted to act with a particular gear in the other element, a shaft extending parallel to the axes of said elements and provided with two diametrically-opposite projecting studs, a drum surrounding said shaft and having a spiral passage formed therein, into which said studs extend, means connected with the drum for transferring the connection between said elements from one of said coacting pairs of gears to another of said pairs, gearing for rotating said shaft, and means controlled by the relative positions of the engaged pair of gears for intermittently actuating said shaft gearing.

8. In a variable speed gear mechanism, the combination of two elements geared together and each comprising a plurality of gears of different diameters, the gears of one element being arranged in reverse order to those of the other and each gear adapted to act with a particular gear in the other element, a shaft extending parallel to the axes of said elements and provided with two diametrically-opposite projecting studs, a drum surrounding said shaft and having a spiral passage formed therein into which said studs extend, means connected with the drum for transferring the connection between said elements from one of said coacting pairs of gears to another of said pairs, means for intermittently rotating said drum shaft to move the drum longitudinally thereof and shift the connection between the elements from one pair of coacting gears to another of said pairs, and means for automatically disconnecting said drum shaft from its driving devices on the completion of such shifting of the connection between the elements.

9. In a variable speed gear mechanism, the combination of two elements geared together and each comprising a plurality of gears of different diameters, the gears of one element being arranged in reverse order to those of the other element, a shaft extending parallel to the axes of said elements, means actuated by said shaft for shifting the connection from one of the coacting pairs of gears to another of said pairs, two clutches each adapted to connect said shaft with power mechanism and to cause said shaft to shift the connection between said elements in opposite directions, means for normally holding both said clutches open, and means for automatically closing one of said clutches and shifting the connection between said elements when the latter occupy a certain relative position.

10. In a variable speed gear mechanism, the combination of two elements geared together and each comprising a plurality of gears of different diameters, the gears of one element being arranged in reverse order to those of the other and each gear adapted to act with a particular gear in the other element, a shaft extending parallel to the axes of said elements and provided with two diametrically-opposite projecting studs, a drum or cylinder provided on its interior with spiral passages into which said studs extend, said passages alternately extending at right angles to the axis of said shaft and diagonal to said axis, means connected with said drum for shifting the connection from one of said co-acting pairs of gears to another of said pairs, means for normally holding the shaft stationary with the studs thereon in sections of the spiral passages in the drum that extend at right angles to the axis of the shaft, and means for rotating said shaft.

11. The combination of two shafts, two reversely arranged series of gears arranged on said shafts in parallel relation, each series comprising a plurality of gears of different diameters, the number of teeth in the gears of each pair bearing such a relation to each other as to bring one tooth of the smaller gear, at regularly recurring intervals of time into engagement with certain "multiple" and "shifting" teeth in the larger gear and speed changing means between the gears of each pair comprising two geared paths, one on each shaft, of equal length, extending from a "multiple" or "shifting" tooth in a gear of large diameter in one pair of gears to a corresponding tooth in a gear of smaller diameter in an adjacent pair of gears, and vice versa, having pitch curves so that they touch tangentially, or roll on each other, the point of contact moving from even with the pitch line of the larger gear to even with the pitch line of the smaller gear, or vice versa.

12. In a variable speed gear mechanism, the combination of two elements rigidly geared together and adapted to rotate about parallel axes, each element comprising a plurality of gears of different diameters, each arranged concentric with its axis, and one or more gears arranged alternately of those aforesaid and eccentric to said axis, each intermediate eccentric gear having two diametrically opposite shifting teeth which respectively aline with teeth in the concentric gears between which said eccentric gear is arranged, the concentric gears of one element being arranged reversely to the similar gears of the other element and each gear being arranged to act with a particular gear of the same form in the other element, means for rotating one of said elements, and means for shifting the connection between said elements from a co-acting pair of concentric gears to an adjacent pair of co-acting eccentric gears and vice versa.

13. In a variable speed gear mechanism, the combination of a motor shaft, a plurality of gears of different diameters mounted to rotate about a common axis and connected with said motor shaft, a driven shaft, a plurality of gears similar to those aforesaid connected to said driven shaft, the gears of one series being arranged in reverse order to those of the other and each gear adapted to act with a particular gear in the other series to connect said shafts, and means for transferring the connection from one of said co-acting pairs of gears to another without interrupting the connection between the motor and driven shafts, during a single revolution of the motor shaft.

14. In a variable speed mechanism, the combination of a motor shaft, a plurality of gears of different diameters mounted to rotate about a common axis and connected with said motor shaft, a driven shaft, a plurality of gears similar to those aforesaid connected to said driven shaft, the gears of one series being arranged in reverse order to those of the other and each gear adapted to act with a particular gear in the other series to connect said shafts, a lever, means adapted to be actuated by said lever for transferring the connection from one of said co-acting pairs of gears to another without interrupting the connection between the motor and driven shafts, and means operated by the motor shaft for automatically returning said lever and shifting devices to normal position upon the completion of a revolution of said motor shaft.

15. In a variable speed mechanism, the combination of two elements each comprising a plurality of gears of different diameters, the gears in one element being arranged reversely to those in the other, a driver connected to one of said elements, a non-flexible connection constantly connecting said elements, and means for shifting the connection between said elements longitudinally of the axes thereof.

16. In a variable speed mechanism, the combination of two elements each comprising a plurality of gears of different diameters, the gears in one element being arranged reversely to those in the other and each gear adapted to act with a particular gear in the other element, the number of teeth in the gears of each pair bearing a definite relation to each other so that during each revolution one tooth of the smaller gear of each pair will be opposite certain " multiple " and " shifting " teeth in the larger coöperating gear, and means constantly connecting said elements and adapted to be shifted from one pair of gears to another when in direct engagement with the " shifting " or " multiple " teeth.

In testimony whereof I have signed my name to this specification in the presence of two subscribing witnesses.

EDWARD P. COWLES.

Witnesses:
HOMER E. STEWART,
DONALD McCURDY.